Jan. 5, 1965  H. O. DIXON  3,164,796
COMPOSITIONS OF GRAPHITE AND POLYETHYLENE
Filed Sept. 11, 1961  2 Sheets-Sheet 1

INVENTOR.
H. O. DIXON
BY Hudson and Young
ATTORNEYS

Jan. 5, 1965   H. O. DIXON   3,164,796
COMPOSITIONS OF GRAPHITE AND POLYETHYLENE
Filed Sept. 11, 1961   2 Sheets-Sheet 2

INVENTOR.
H. O. DIXON
BY *Hudson and Young*

ATTORNEYS

United States Patent Office 3,164,796
Patented Jan. 5, 1965

3,164,796
COMPOSITIONS OF GRAPHITE AND
POLYETHYLENE
Henry O. Dixon, Bartlesville, Okla., assignor to Phillips
Petroleum Company, a corporation of Delaware
Filed Sept. 11, 1961, Ser. No. 137,248
2 Claims. (Cl. 338—28)

This invention relates to novel compositions of graphite and solid polyethylene. More specifically, the invention relates to novel compositions of natural flake graphite and high density, highly crystalline solid polyethylene such as that produced by the low-pressure polymerization process. Another aspect of this invention is directed to improved articles fabricated from these novel compositions and to their use.

It is known to disperse carbon black in a hydrocarbon wax and then blend the dispersion in solid polyethylene. It is also known that carbon blacks of certain particle size can be incorporated directly into solid polyethylene. These prior art methods were applied to polyethylene produced by the so-called high pressure process wherein pressures in the order of 500 atmospheres or higher were employed. It is also known that carbon black-graphite mixtures can be blended into solid polyisobutylene at relatively low temperatures, e.g., 80° C., whereas higher temperatures, such as to subject the polyisobutylene to the danger of degradation, are required to blend either carbon black or graphite into the solid polyisobutylene.

It is an object of the present invention to provide a composition comprising an intimate dispersion of graphite and solid linear polyethylene. It is also an object to provide a method for blending or dispersing a mixture of graphite and linear polyethylene. Another object is to provide a composition comprising solid linear polyethylene and graphite suitable for making machine bearings. Another object is to provide a composition comprising solid linear polyethylene and graphite suitable for making electrical resistors. A further object is to provide a composition comprising solid linear polyethylene and graphite suitable for making pencil leads. Other and further objects and advantages will be apparent to one skilled in the art upon study of the disclosure of the invention including the detailed description and the appended drawing wherein:

Broadly, the present invention provides a method for incorporating graphite into solid polyethylene in both minor and major amounts. The invention is based upon the discovery that finely divided, natural flake graphite and high density, solid polyethylene such as that produced by the low-pressure polymerization process are compatible so that the finely divided graphite and finely divided solid polyethylene can be blended together and then heated to form an intimate admixture which appears to be a dispersion of graphite in solid polyethylene. Useful compositions can be readily prepared containing from about 10 weight percent graphite and about 90 weight percent polyethylene to about 90 weight percent graphite and about 10 weight percent polyethylene so long as the solid polyethylene has a density of at least about 0.95 gram per cubic centimeter (cc.), a crystallinity of at least about 85 percent and a softening temperature of at least about 250° F. Solid polyethylene having the above properties can be prepared according to the process disclosed in U.S. Patent 2,825,721, issued March 4, 1958, to J. P. Hogan et al.

A particularly preferred solid polyethylene can be prepared according to a method disclosed in copending application Serial No. 590,567, filed June 11, 1956, now abandoned, by G. T. Leatherman et al., which method is based on the discovery that there is a critical polymerization temperature range within the broad range disclosed in Serial No. 573,877, now Patent No. 2,825,721, and that by carrying out the polymerization of ethylene at temperatures within this critical temperature range, certain unexpected results and advantages are obtained especially with relation to the yield and the form of the ethylene polymers. The polymers produced according to the process of Leatherman et al. are characterized by a melt index (ASTM D1238–57T) below 0.2. These polymers are also characterized by high molecular weight, high softening temperature and high tensile strength.

The Leatherman et al. process comprises contacting ethylene or mixtures of ethylene with other unsaturated hydrocarbons with a suspension of chromium oxide-containing catalyst in a liquid hydrocarbon diluent, the contacting occurring at a temperature such that substantially all of the polymer produced is insoluble in the diluent and is in solid particle form, the particles being substantially nontacky and nonagglutinative in the liquid diluent.

Figure 1:
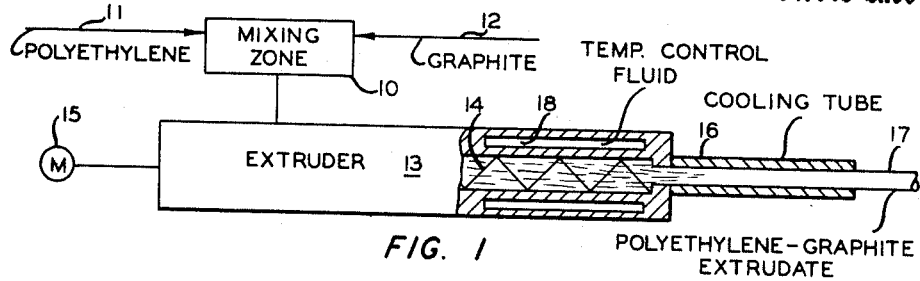
FIGURE 1 is a side view, partly in elevation and partly in section, providing a diagrammatic illustration of the method of extruding shaped articles of blends of solid linear polyethylene and graphite of the invention.

Referring now to FIGURE 1 of the drawing, finely divided solid linear polyethylene and finely divided flake graphite are introduced into mixing zone 10 via conduits 11 and 12 and intimate admixture of polyethylene and graphite is passed from mixing zone 10 to extruder 13 having therein a screw type conveyor 14 which is rotated by motor 15. The mixture of polyethylene and graphite is plasticized by the work performed upon it by the screw conveyor 14 and is extruded through the cooling tube 16 to produce the extrudate indicated at 17. Heat is added to or withdrawn from the cavity 18 which surrounds the screw conveyor 14 so as to maintain the mixture of polyethylene and graphite at the proper temperature. Cooling tube 16 serves to maintain a predetermined back pressure on the extruder 13 and to confine the extrudate to the undesired size and shape until it has cooled sufficiently to maintain, unsupported, the desired size and shape.

The configuration or shape of the extrudate will be determined by the die employed and dies are commercially available for the extrusion of rods, tubes and slabs.

Figures 2, 3:
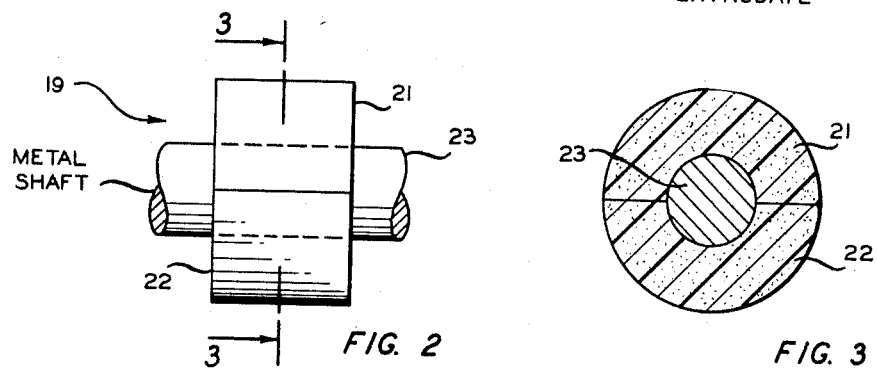
FIGURE 2 is a view, in elevation, of a polyethylene-graphite bearing.
FIGURE 3 is a view along line 3—3 of FIGURE 2.

FIGURE 2 illustrates a machine bearing 19, fabricated from a polyethylene-graphite composition according to the invention, which can be composed of two half rings 21 and 22 mounted upon a shaft 23. The bearing 19 can be fabricated from a tube extruded in an extruder such as that illustrated in FIGURE 1 or can be fabricated by other known means such as compression or injection molding.

Figures 4, 5:
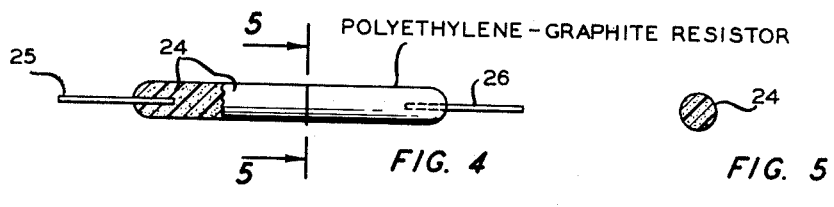
FIGURE 4 is a side view, partly in section and partly in elevation, of a polyethylene-graphite resistor.
FIGURE 5 is a view along line 5—5 of FIGURE 4.

FIGURE 4 illustrates an electrical resistor 24 made of a polyethylene-graphite composition according to the invention and having terminals 25 and 26 imbedded in the ends thereof.

Figures 6, 7:
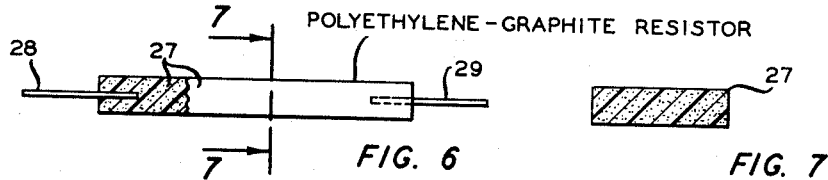
FIGURE 6 is a view, partly in section and partly in elevation, of another modification of the resistor of FIGURE 4.
FIGURE 7 is a view along line 7—7 of FIGURE 6.

FIGURE 6 shows an electrical resistor 27 made in the form of a slab or ribbon of a polyethylene-graphite composition of the invention and having terminals 28 and 29 imbedded in the ends thereof.

Figures 8, 9:
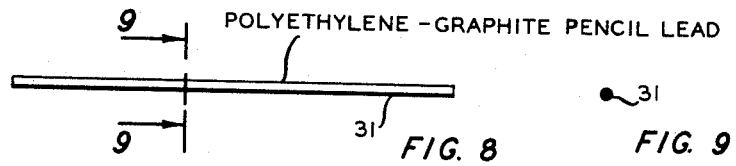
FIGURE 8 is a side view, in elevation, of a polyethylene-graphite pencil lead.
FIGURE 9 is a view along line 9—9 of FIGURE 8.

FIGURE 8 illustrates a pencil lead 31 fabricated from a polyethylene-graphite composition according to the invention. The resistors of FIGURES 4 and 6 and the pencil lead of FIGURE 8 can conveniently be extruded utilizing an extruder such as illustrated in FIGURE 1.

Figure 10:
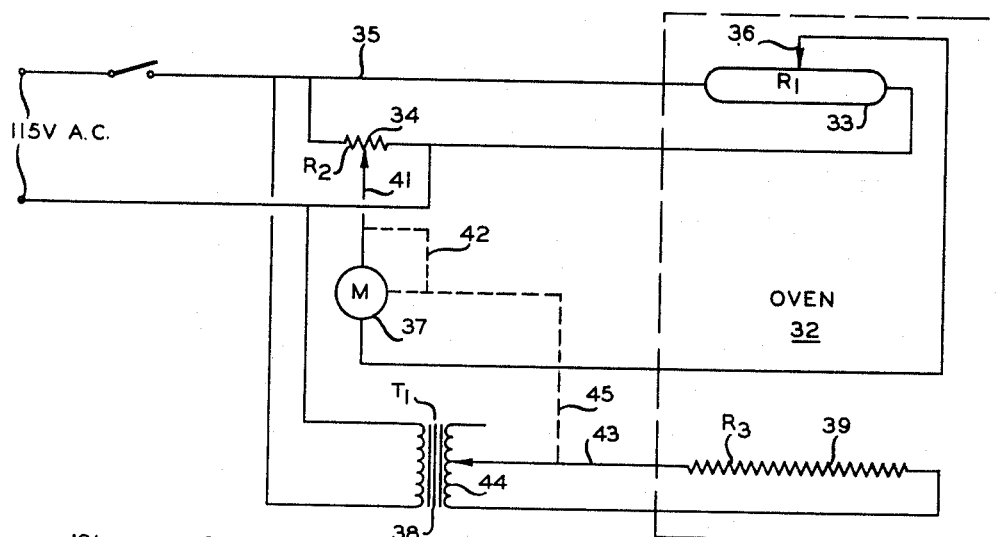
FIGURE 10 is a diagrammatic illustration of an oven having incorporated therein a resistor of the invention.

FIGURE 10 illustrates a drying oven 32 which utilizes a resistor of the present invention in the control system employed to control the temperature of the oven 32. Temperature sensitive resistance element 33 inside the oven is fabricated from a polyethylene-graphite composition of the invention and is selected to have about the same magnitude of resistance as variable resistor 34 which can be a commercially available variable resistor which is substantially insensitive to variations in temperature. The resistors are connected in parallel across the power supply line 35. The slider or contactor 36 on resistor 33 is preset to maintain the desired temperature in the oven 32. The contactor 36 is connected to one side of motor 37 whose shaft is mechanically coupled to the shaft of a variable transformer 38 which controls the voltage impressed on resistance heater 39 utilized to heat the oven 32. The contactor 41 on resistor 34 is connected to the opposite side of motor 37 with respect to the contactor of resistor 33. When the contactor 41 is positioned on resistor 34 so that the resistance of 34 balances that of the preset resistance of resistor 33, motor 37 remains stationary. Resistor 33, being temperature sensitive, will cause a variable resistance depending on the temperature of the oven. Any imbalance in resistance between resistor 33 and resistor 34 will cause movement of motor 37 and also movement of contactor 41 because of the mechanical linkage 42 which operatively connects motor 37 and contactor 41. Motor 37 will move and will concomitantly move contactor 41 until the resistance of resistor 34 balances that of resistor 33.

Variable transformer 38 supplies heat to the oven 32 by means of resistance heater 39 in accordance with the position of contactor 43 on the coil 44 of transformer 38. The contactor 43 is also operatively connected to the motor 37 by means of mechanical linkage 45 so that movement of the motor 37 to balance the resistance of resistor 34 with that of resistor 33 varies the amount of heat supplied to oven 32.

Figure 11:
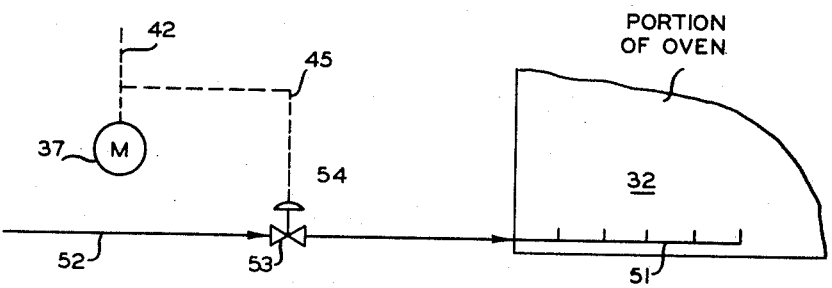
FIGURE 11 is a detail of a modification of the heating means and control of FIGURE 10.

A modification of the oven shown in FIGURE 10 is illustrated in FIGURE 11 wherein a combustible fuel such as natural gas is introduced to a burner 51 via conduit 52 and a control valve 53 to supply heat to the oven 32. A valve stem 54 associated with valve 53 is actuated by motor 37 by means of the linkage 45.

Figure 12:
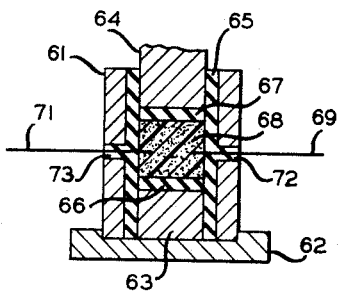
FIGURE 12 is a section of an elevation of a device for measuring electrical resistance of a resistor of the invention according to applied pressure.

FIGURE 12 illustrates a method and means for subjecting a resistance element of the invention to pressure. A cylinder 61 on a base 62 contains a back-up plate 63 and a piston 64. These elements are preferably fabricated from material of considerable strength such as steel or other metal. A liner of insulation, such as polytetrafluoroethylene, glass, rubber, or the like, for the cylinder 61 is indicated at 65. Similar insulation covers the exposed faces of back-up plate 63 and piston 64 as shown at 66 and 67. A resistance element 68, comprising linear solid polyethylene and natural flake graphite, is positioned in the cylinder so as to be subjected to pressure from piston 64. Electrodes 69 and 71 are embedded in the resistance element 68 and project through openings in the cylinder 61 protected by insulation as indicated at 72 and 73.

Figure 13:
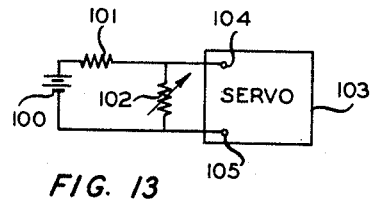
FIGURE 13 illustrates an electrical circuit for recording and utilizing the device of FIGURE 12.

Electronic equipment for recording resistance is available commercially and the principle of operation of such is shown in FIGURE 13 wherein battery 100 is connected through balanced resistances 101 and 102 to servo circuit 103 by means of contacts 104 and 105. Resistance 101 is a fixed resistance and resistance 102 is a variable resistance, such as 68 of FIGURE 12 between electrodes 69 and 71. The servo circuit 103 is conventional and is illustrated and described in "Electronic Control Handbook" by R. T. Barcher and William Moulic, copyright 1946, published by Caldwell-Clements Inc., 480 Lexington Ave., New York city, at pages 298–300. Connections 104 and 105 represent connections made with electrodes 69 and 71 of FIGURE 12.

Changes in pressure applied to piston 61 of FIGURE 12 can be recorded or utilized to perform a desired function by use of a conventional recorder or a conventional recorder-controller with the circuit of FIGURE 13.

The following examples will be helpful in understanding the present invention but are not to be construed as limiting the invention. In the following examples the polyethylene utilized was made according to the process described in the above referred to U.S. Patent 2,825,721 and had the following properties: density of 0.96; melt index of 0.9; and crystallinity of about 90 percent. The graphite was grade 38 graphite powder made from natural flake graphite. Zinc dust was used in the compositions containing zinc. All of the materials were pulverized so as to pass through a 100-mesh screen. In preparing the compositions the materials were dry blended and the powdered mixtures were placed in a 1¼" mold and heated to about 340° F. at a pressure of about 4000 p.s.i. The temperature was then increased to 370° F. whereupon the pressure increased to about 7500 p.s.i. The heat source was removed and the mold allowed to cool to about 180° F. before the mold pressure was released. Discs varying in thickness from ⅙₃₂" to ⅞₃₂" were produced.

Discs having the compositions shown in Table I were tested for electrical resistance properties. On a diameter and one inch apart two holes were drilled through each disc. The discs were ¼" thick and 1⅛" in diameter. From each hole to the edge of the disc a V notch was cut deep enough to accommodate a No. 18 wire. On the notched side a piece of No. 18 copper wire about 3 inches long was forced into each hole until the end of the wire was flush with the other side of the disc. The long end of the wire was bent over into the notch to provide the electrodes for electrical resistance tests.

Resistance measurements were made, using an ohmmeter, while the sample was subjected to measured pressure in a Carver press. Polyethylene insulators on each side of the sample prevented contact of the sample with the metal of the press.

TABLE I

*Resistance of Polyethylene-Graphite Mixtures at Different Pressures*

| Weight Percent 80% Polyethylene, 10% Graphite, 10% Zinc | | Weight Percent 80% Polyethylene, 20% Graphite | | Weight Percent 90% Polyethylene, 10% Graphite | |
|---|---|---|---|---|---|
| Applied Force, Lbs. | Resistance, Ohms | Applied Force, Lbs. | Resistance, Ohms | Applied Force, Lbs. | Resistance, Ohms |
| 0 | 27 | 0 | 260 | 0 | 5,000 |
| 500 | 29 | 250 | 300 | 250 | 7,500 |
| 750 | 31 | 750 | 320 | 500 | 8,000 |
| 1,000 | 32 | 1,000 | 350 | 750 | 10,000 |
| 1,250 | 34 | 1,250 | 370 | 1,000 | 11,000 |
| 1,500 | 36 | 1,500 | 410 | 1,500 | 12,000 |
| 1,750 | 38 | 2,000 | 470 | 2,000 | 13,500 |
| 2,000 | 40 | 2,500 | 510 | 2,500 | 20,000 |
| 2,250 | 44 | | | | |
| 2,500 | 47 | | | | |
| 2,750 | 50 | | | | |
| 3,000 | 55 | | | | |

Compositions containing about 80 to about 90 weight percent solid polyethylene in combination with graphite are particularly desirable as pressure transducers. Table I shows that materials such as zinc are not desirable in these compositions even though zinc is an electrical conductor. Such compositions show very little sensitivity to pressure.

A 50 weight percent polyethylene-50 weight percent graphite disc 5/32" thick and 1¼" in diameter was machined to 1⅛" diameter and tapped for insertion of two machine screws in diametrically opposed relationship to act as the electrodes. The distance between the inserted screws was ⅞". A polyethylene shell was molded about the disc to serve as insulation. At 74° F. an ohmeter connected to the two screws registered 0.90 ohm. A heating lamp (infrared) was utilized to heat the disc. The ohmeter registered an increase in resistance as heating of the sample profressed and after about 20 minutes the temperature leveled out at about 220° F. and the ohmeter registered 1.15 ohms.

The sensitivity of the resistance element would be greater if the disc contained at least about 75 weight percent polyethylene as evidenced by the rather low resistance of the 50–50 mixture at atmospheric temperature.

Mixtures of polyethylene and graphite were prepared in various ratios of polyethylene and graphite. The various mixtures were heated and extruded through the tip of a mechanical pencil to produce pencil leads. The leads were tested for writing characteristics and were graded as to hardness by comparison with conventional pencil leads. The results are shown in Table II.

TABLE II

*Polyethylene-Graphite Pencil Leads*

| Ingredients, Weight Percent | | Hardness Grade |
|---|---|---|
| Polyethylene | Graphite | |
| 20 | 80 | Soft. |
| 33 | 67 | Soft. |
| 50 | 50 | Medium |
| 67 | 33 | Hard. |
| 80 | 20 | Extra Hard. |

In each case it was noted that less effort was required to produce a representative mark with the polyethylene-graphite compositions than with the comparable commercial pencil lead. The pencil leads of the invention display smooth writing contact. The marks do not smudge easily but are readily erased.

Compositions containing from about 10 weight percent polyethylene and 90 weight percent graphite to about 90 weight percent polyethylene and 10 weight percent graphite can be utilized in fabricating machine bearings for relatively light duty machines such as household appliances, electric motors, automobile starters and generators, and the like. Bearings for use at temperatures of about 220° F. and higher should be fabricated from compositions of polyethylene and graphite containing at least about 50 weight percent graphite and bearings for use at temperatures of about −40° F. and lower should be fabricated from compositions of polyethylene and graphite containing at least about 50 weight percent polyethylene.

Such bearings require no additional lubrication and are referred to as "oil-less" bearings. Such oil-less bearings do not require packing glands or seals; however, these bearings can be utilized with packing glands where pressures and/or temperatures are sufficiently high to cause the bearing material to exhibit unwanted flow characteristics. As a result of the thermoplastic properties of the bearing compositions the material can be extruded into the bearing cavity and maintained in the bearing cavity by a packing gland or by closing the annular opening with shim stock.

This disclosure indicates the variety of useful materials which can be fabricated from the novel compositions of this invention which are prepared by dry blending finely divided solid linear polyethylene and natural flake graphite and molding the resulting intimate admixture; however, the disclosure is not exhaustive and other uses of the compositions are possible without departing from the spirit and scope of the present invention.

That which is claimed is:
1. A composition of matter consisting essentially of a dispersion of about 10 to 90 weight percent of finely divided natural flake graphite in about 10 to about 90 weight percent of solid polyethylene having a density of about 0.94 to about 0.99 gram per cc. and a crystallinity of at least about 85 percent.
2. A pressure sensitive and temperature sensitive electrical resistor consisting essentially of an intimate mixture of about 10 to about 90 weight percent of solid polyethylene having a density of about 0.94 to about 0.99 gram per cc. and a crystallinity of at least about 85 percent, and about 10 to about 90 weight percent of finely divided natural flake graphite, formed at a temperature of about 340 to about 450° F. and a pressure of at least about 4000 p.s.i.; and having metal terminals secured thereto.

References Cited in the file of this patent

UNITED STATES PATENTS

| 2,726,231 | Field et al. | Dec. 6, 1955 |
| 2,730,597 | Podolsky et al. | Jan. 10, 1956 |
| 2,825,721 | Hogan et al. | Mar. 4, 1958 |
| 2,878,353 | Ely et al. | Mar. 17, 1959 |
| 2,887,471 | Shearer et al. | May 19, 1959 |
| 2,978,665 | Vernet et al. | Apr. 4, 1961 |